April 22, 1969 E. M. DEAN 3,440,646

CODE CONVERSION MEANS

Filed Oct. 15, 1965

Sheet 1 of 4

3,440,646
CODE CONVERSION MEANS

Erasmus M. Dean, Stamford, Conn., assignor to The Bunker-Ramo Corporation, Stamford, Conn., a corporation of Delaware Continuation-in-part of application Ser. No. 460,307, June 1, 1965. This application Oct. 15, 1965, Ser. No. 496,279
Int. Cl. G08c 9/00
U.S. Cl. 340—347 9 Claims

ABSTRACT OF THE DISCLOSURE

A code conversion means which includes register means for receiving data signals in a first code format having a predetermined bit count for each of a plurality of characters which are to be represented, which register means is effective to double the bit count of the signals applied thereto. The output from the register means is applied in parallel to a decoding translator means which is made up of a first stage translator and a second stage translator. The first stage translator includes at least two decoder matrices with different selected combinations of the outputs from the register means being connected to each of the matrices. Each of the matrices has a plurality of output leads which corresponds in number to the maximum number of distinct permutational arrangements of the bit supplied thereto and includes means for selecting and energizing a single one of the output leads for each permutational arrangement of the bit supplied thereto. The second stage translator includes a plurality of gating means connected to the first stage translator for permutationally ANDing each of the output leads of at least one of the matrices with each output lead of the other of the matrices. The second stage translator has a plurality of output leads corresponding in number to the number of characters to be represented. The plurality of gating means in the second stage translator serve as means for selecting and energizing a selected one of the second stage translator output leads for each permutational arrangement of bits applied to the second stage translator.

The present invention relates to electronic apparatus, and, more particularly to code conversion means. The present application is a continuation-in-part of copending application, Ser. No. 460,307, filed June 1, 1965, now abandoned.

In the art relating to data processing equipment, there is often a need for means for effecting the conversion of data signals in one code format to corresponding data signals in a different code format. For example, in a copending application of Belcher et al., Ser. No. 370,323, filed May 26, 1964, a system is provided wherein data signals representative of alpha-numerical data are processed in the form of a six-bit code but must be converted to a thirty-five bit code to enable a display of the represented characters.

It is, accordingly, an object of the present invention to provide an improved code conversion means.

It is another object of this invention to provide an improved code converter for converting data representing digital code signals into character display code signals.

It is a further object of this invention to provide a character signal generator.

In accomplishing these and other objects, there has been provided, in accordance with the present invention, means for first converting multiple digit code signals into an intermediate code wherein each represented character is uniquely indentified by a signal on a separate output line. Means are then provided for converting the individual character signals into a new multiple digit character display code.

Figure 1:
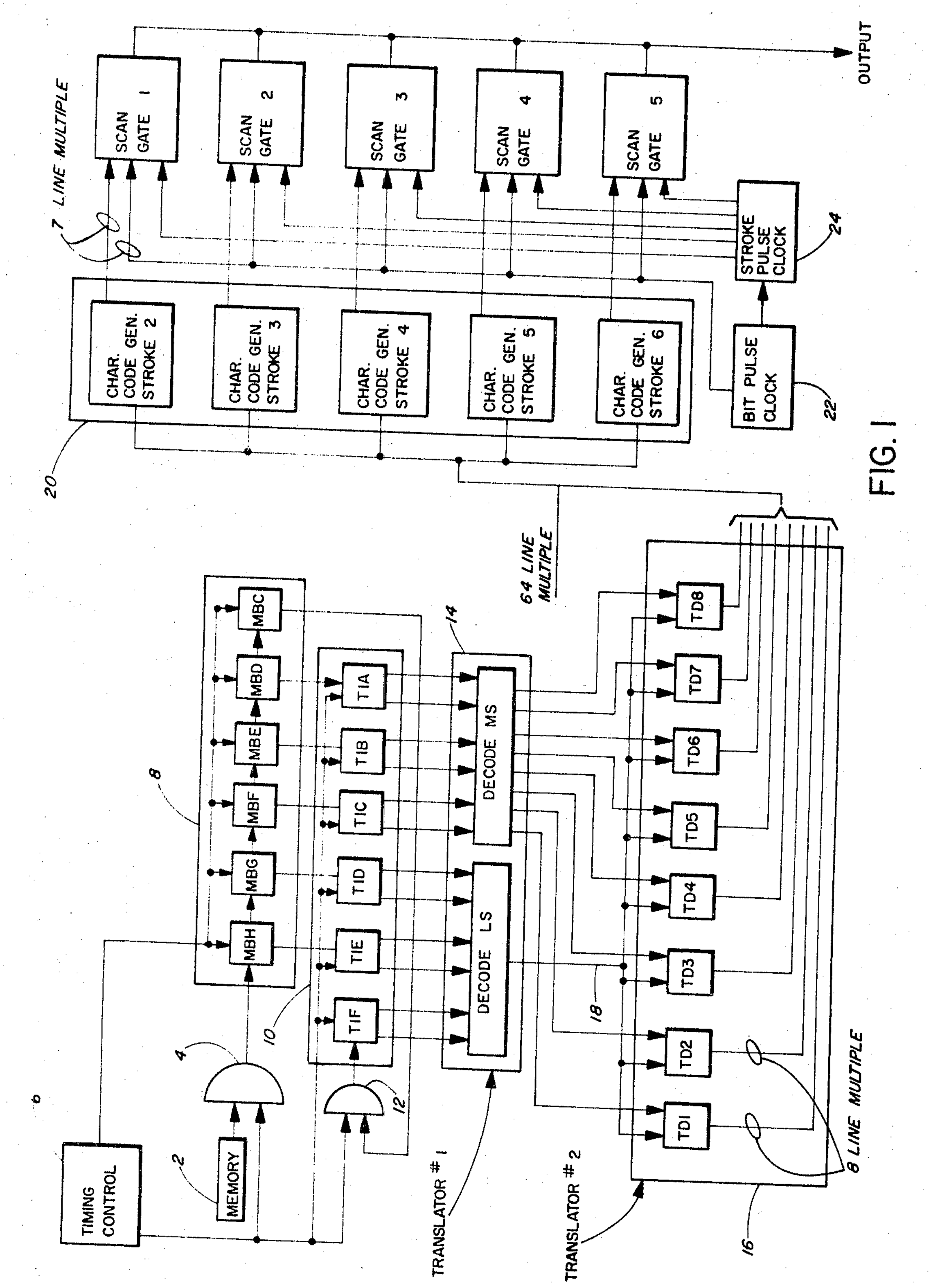
Figure 2:
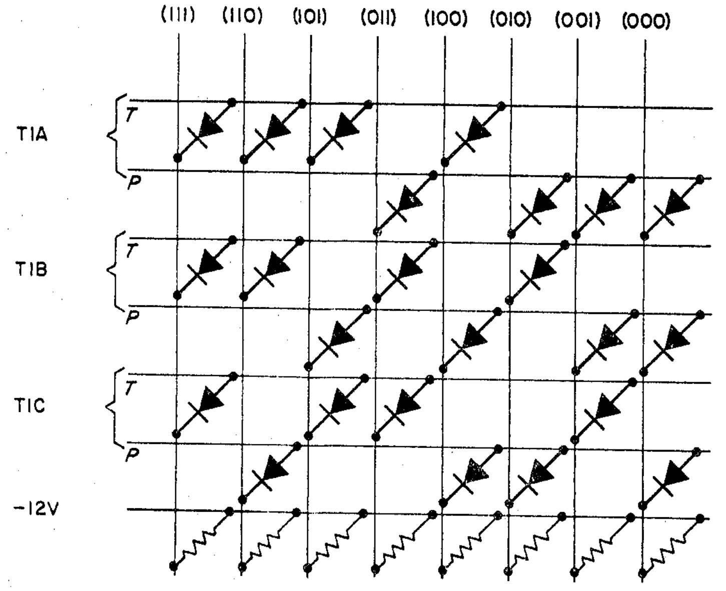
Figure 3:
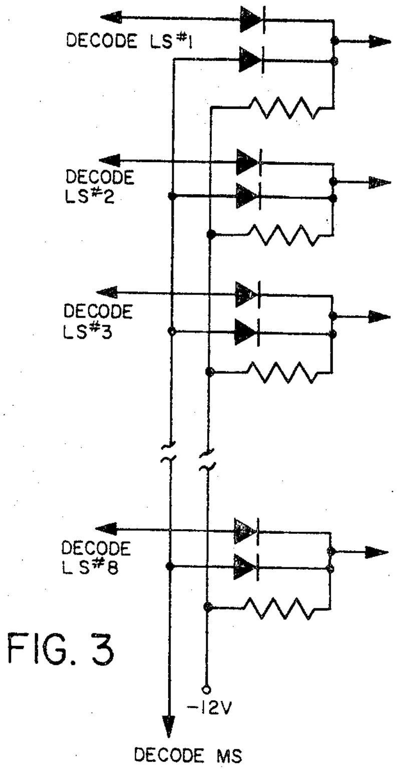
Figure 4:
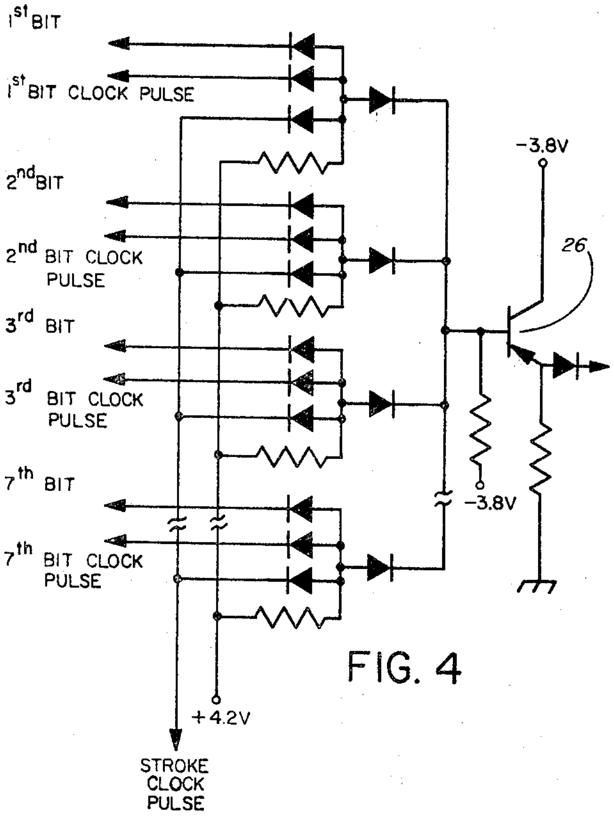
Figure 5:
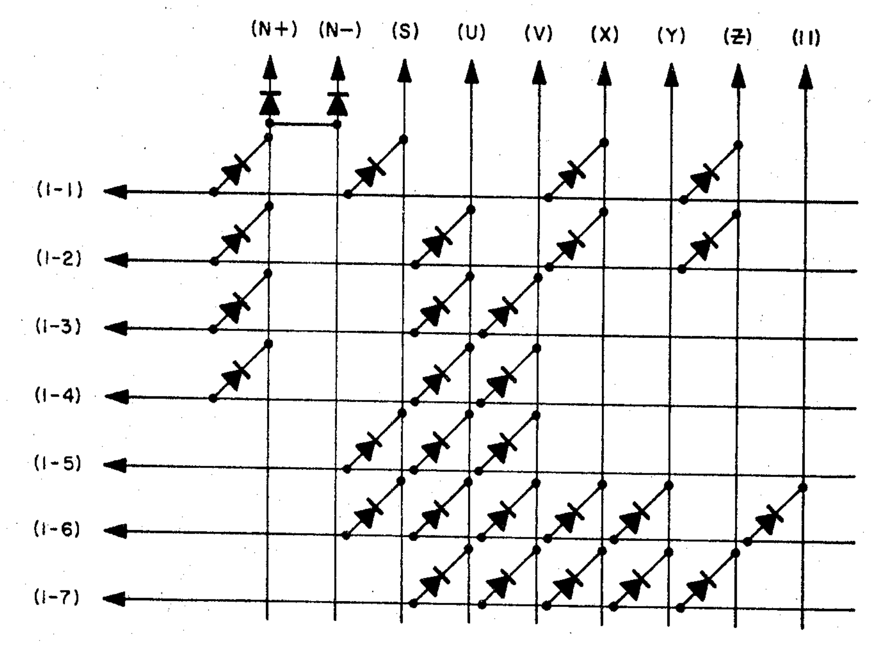
Figure 7:
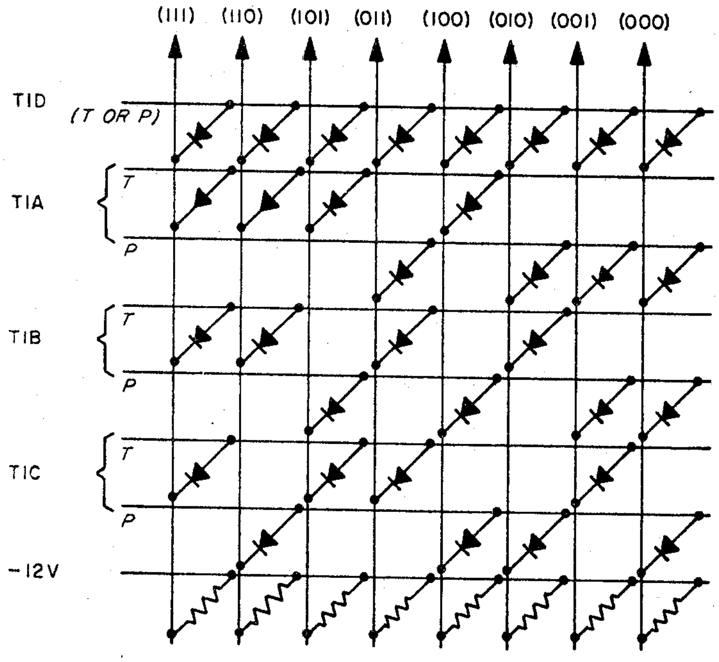
Figure 6:
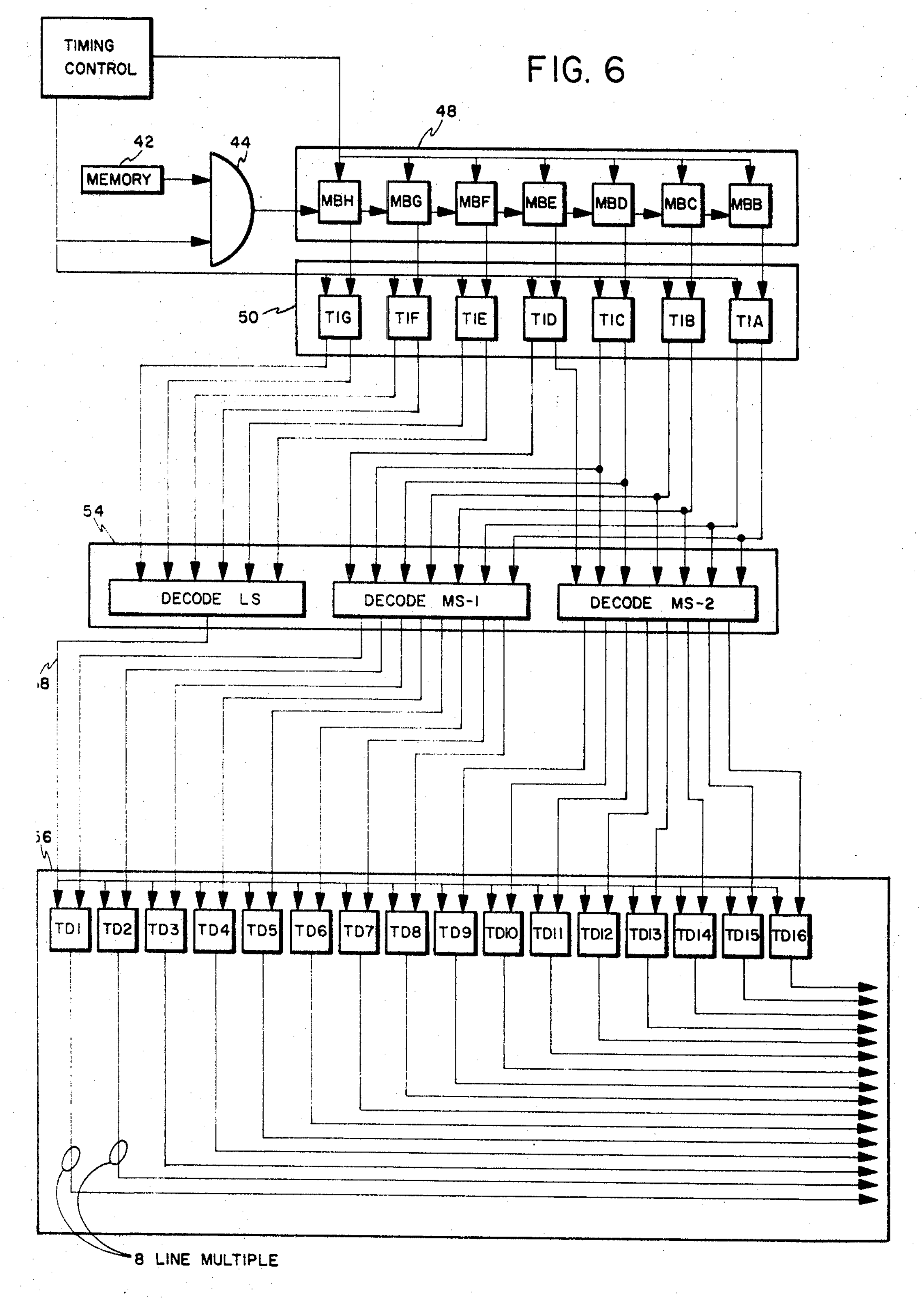

A better understanding of this invention may be had from the following detailed description when considered in connection with the accompanying drawings in which;

FIGURE 1 is a schematic block diagram of a code conversion system embodying the present invention, FIGURE 2 is a schematic diagram of decoder means suitable for use in the system of FIGURE 1, FIGURE 3 is a schematic diagram of further decorder means suitable for use in the system of FIGURE 1, FIGURE 4 is a schematic diagram of a serializing scanner suitable for use in the system of FIGURE 1, FIGURE 5 is a schematic diagram of a representative portion of a character generator suitable for use in the system of FIGURE 1, FIGURE 6 is a schematic block diagram of a somewhat different code conversion system but also embodying the present invention, and FIGURE 7 is a schematic diagram of a decoder means, similar to that shown in FIGURE 2, but suitable for use in the system of FIGURE 6.

Referring now to the drawings in more detail, there is shown in FIGURE 1, a memory means 2 which constitutes a source of character representing digital code signals. For purposes of this description, these code signals will be assumed to be a six-bit binary code, the arrangement of the marked bits within the six-bit pattern representing the various characters of an alpha-numeric system. The digit bits of each character emerge from the memory means 2 in serial order. The emerging bits are gated, through a control gate 4, under control of timing signals from a master timing control 6, into a six stage memory buffer 8. The successive bits of each character code are stepped through successive stages of the buffer 8, under control of timing signals from the timing control 6, until the buffer 8 is full.

When the buffer 8 is full, timing control 6 generates an output signal which permits the stored character bits to be transferred, in parallel, into a translator input buffer 10. The bit stored in stage MBD of the memory buffer 8 is transferred into stage TIA of the translator input buffer 10. Similarly the bit in MBE is transferred to TIB, in MBF to TIC and so on. The bit stored in stage MBC is an identifier bit and is transferred through a gate 12 into stage TIF of the buffer 10. Each of the stages TIA through TIF is a transistor flip-flop circuit having a "true" and a "prime" output lead. A logical "one" will appear on the "true" output lead and a logical "zero" on the other when a bit is marked in a particular stage. When a bit is not marked in that stage, the reverse relation obtains. Thus, there are provided two output leads for each buffer stage, effectively doubling the bit count of the data signals.

In the present system, both of the output leads of each stage of the buffer 10 are applied as input control signals to a translator decoder. These signals might be used to control a single large decoder which would require a complex circuitry. In the interest of simplicity and economy, however, the translator of the present invention includes two cascaded stages. The first stage translator 14 includes two decoding matrices. The first of these, decode LS, decodes the three least significant digits of the code transferred from the buffer 10. The second of these, decode MS, decodes the three most significant digits of the code transferred from the buffer 10. The two matrices are identical, one of which, Decode MS, is two matrices are identical, one of which, decode MS, is illustrated in FIGURE 2. There it may be seen that the "true" and "prime" leads from the buffer stage TIA are connected, respectively, to the first two rows of the matrix. Similarly, the "true" and "prime" leads of buffer stages TIB and TIC are connected, respectively, to the third, fourth, fifth and sixth rows. Each combination of marked or unmarked bits in the buffer stages TIA, TIB and TIC effects the selection of a unique one of the output columns as indicated. All other output columns have a minus potential as a result of the minus 12 volt bias applied to each column. Thus, any character code, three digits of which are buffered in the TIA-TIC stages of the buffer 10, results in a signal appearing on only one of the eight output lines of the Decoder MS.

In the same manner, a combination of marked or unmarked bits in the buffer stages TID, TIE and TIF effects the selection of one of the eight output columns 18 to carry an output signal from the other matrix Decoder LS. Thus, the output of each decoder matrix comprises a one-out-of-eight selection, each matrix having eight output leads, only one of which is energized at a time.

The output leads of the two sections of the first stage translator 14 are combined in a second stage translator 16. The second stage 16 includes eight translator decoders TD1 through TD8, each of which includes eight AND gates. This construction may be of the standard type illustrated in FIGURE 3. The mode of the combination of the output signals of the two eight-line sections of the first stage translator 14 in the second stage translator 16 is as follows:

The lead 18 from the Decoder LS matrix is an eight wire multiple, all eight output leads of which are connected in parallel to all eight of the translator decoders TD1 through TD8. At each of the translator decoders TD1 through TD8, each of the output leads 18 is connected, respectively, to one of the AND gates. The eight output leads from the Decode MS matrix are separately applied to the translator decoders TD1 through TD8, one output lead to each of the translator decoders. As an example, the first output lead from the Decode MS matrix is connected to the translator decoder TD1. That lead is connected in parallel to all eight of the AND gates of the TD1. Thus, the first output lead of the Decode MS Matrix is "ANDed" separately with all eight of the output leads of the Decode LS matrix in the translator decoder TD1. Similarly, the second output lead of the Decode MS matrix is "ANDed" separately with all eight of the output leads of the Decode LS matrix in the translator decoder TD2. A correspondingly similar relationship obtains in the remainder of the translator decoders TD3 through TD8. In this manner, all eight of the output leads of the Decode MS matrix are "ANDed" separately with all eight of the output leads of the Decode LS matrix. From FIGURE 3 it may be seen that each of the AND gates of each translator decoder has a separate output lead. Since each translator decoder has eight AND gates and the second stage translator has eight translator decoders, there results an array of sixty-four output leads from the second stage translator 16.

A signal on one of the output leads of the Decoder MS "enables" the translator decoder to which it is connected. Since only one of the eight output leads is energized for each character code, only one of the translator decoders is "enabled" for each character code. Similarly, only one of the output leads from the Decoder LS is energized for each character code. The combination of these two sets of signals in the second stage translator 16 results in the selection and energization of only one out of sixty-four output leads, each of the translator output leads uniquely representing a different input character code input to the system from the memory device 2. This constituted an intermediate code for the characters represented by the input code.

In the aforementioned copending application, each of the characters is displayed on the face of a cathode ray tube in the format of a substantially rectangular array 5 x 7 dot matrix. The array includes five parallel substantially vertical strokes with seven dots or bits in each stroke. In order to convert the intermediate code, represented by the sixty-four individual lines, to a thirty-five bit character display code, the sixty-four leads are connected as separate input leads to a character generator matrix 20.

The character generator matrix 20 may be in the form of a single matrix with sixty-four input leads and thirty-five output leads. In this case, the thirty-five output leads would be considered as five groups of seven output leads with each group representing one of the vertical strokes and each of the seven leads in each group representing one of the dot bits in the associated stroke. This feature is illustrated in FIGURE 1 by showing the character generator 20 as being subdivided into five subsections, each subsection being identified with one of the character strokes. The output lead from each of the subsections represents a seven wire multiple. A representative portion of such a matrix is illustrated in FIGURE 5. Here, the several input leads are shown as the vertical columns and the horizontal rows represent the output leads corresponding to the seven bit position of the first stroke. The several input leads are diode coupled to the corresponding output leads to "mark" the appropriate bits in the several strokes. While, as noted, the character generator matrix 20 may be in the form of a single matrix, for convenience of handling and assembly, this matrix may be subdivided into a number of smaller segments, of which the portion shown in FIGURE 5 may be considered a complete segment. In either case, the result is the same; the sixty-four line input code is converted into a thirty-five bit code on thirty-five output leads.

This thirty-five bit code appears as a parallel output signal from the character generator matrix 20. In order for this code to be displayed on the face of a cathode ray tube output device, the thirty-five bit parallel code must be converted into a thirty-five bit serial code. To this end, the thirty-five output leads from the character generator 20 are connected, in groups of seven, to a group of five sequentially activated scan gates. It might be noted, at this point, that the first subsection of the character generator 20 is identified with stroke 2. This arrangement allows the first stroke of a six-stroke format to constitute an unmarked spaced between adjacent characters on the display device.

Each of the five scan gates comprises seven three-input AND gates such as that illustrated in FIGURE 4, and corresponds to one of the five character strokes at the display device. The seven AND gates of each scan gate correspond to the seven bits of each of the associated strokes. With reference to FIGURE 4, it may be seen that the character generator output lead representing the data bit is connected to one of the input leads of the corresponding AND gate. The second input of the AND gate is connected to a source of bit-time clock pulses, shown as a bit pulse clock 22 in FIGURE 1. The output of the bit pulse clock 22 is a seven-line multiple which is connected in parallel to the five scan gates, one line being connected to the second input of each of the seven AND gates in each scan gate. The seven lines of the bit pulse clock 22 are sequentially energized in timed relation. The third input of each of the AND gates of the five scan gates is connected to a source of stroke-time clock pulses, shown as a stroke pulse clock 24 in FIGURE 1. There are five output leads from the stroke pulse clock 24. The first output lead from the stroke pulse clock 24 is connected in parallel to the third input of all of the AND gates in Scan Gate 1; the second output lead is connected in parallel to the third input of all of the AND gates of Scan Gate 2 and so on. The output leads of the stroke pulse clock are sequentially energized in time relation corresponding to the generation of the strokes.

In each scan gate, the output of the several AND gates is "ORed" together, amplified as by a transistor amplifier 26, then the output of the five scan gates is "ORed" together to produce a serial output code. Since there must be a coincidence of signals on all three of the input leads, the conjoint operation of the bit pulse clock 22 and the stroke pulse clock 24 effect a sequential scanning of the thirty-five input leads, producing output pulses in serial timed sequence whenever a marked data bit is found on one of the thirty-five input leads as it is being scanned. These serialized data bits may then be transmitted to the data display device to effect a display of the coded characters.

While the character generator and serializer have been described in terms of a 5 x 7 dot matrix character display, it will be appreciated that other display format arrangements may be made which still embody the present invention.

The description thus far given is based on the assumption that the input code signal is a six-bit binary code. The same inventive concept may be embodied in a structure designed to accommodate a code in which there are seven data bits per character. For example, the so-called ASCII code includes seven data bits. In FIGURES 6 and 7, there is illustrated those portions of the system which differ from that shown in FIGURES 1 and 2 in order to permit the system to accommodate the seven-bit data code. With reference now to FIGURE 6, it may be seen that there has been provided a memory means 42 which constitutes a source of character-representing digital code signals. The data bits representing each character emerge from the memory means 42 in serial order. The emerging bits are gated through a control gate 44, under control of timing signals from a master timing control 46 into a seven-stage memory buffer 48. The successive bits of each character code are stepped through successive stages of the buffer 48, under control of timing signals from the timing control 46, until the buffer 48 is full.

When the buffer 48 is full, the stored character bits are transferred, in parallel, into a translator input buffer 50. The bit stored in stage MBB of the memory buffer 48 is transferred into stage TIA of the translator input buffer 50. Similarly, the bit in MBC is transferred to TIB, in MBD to TIC, and so on. As before, each of the stages TIA to TIG of the translator input buffer 50 is a transistor flip-flop circuit having a "true" and a "prime" output lead. A logical "1" will appear on the "true" output lead and a logical "0" on the other when a bit is marked in a particular stage. When a bit is not marked in that stage, the reverse relation obtains. Again, there is provided an effective doubling of the bit count of the data signals.

As before, both of the output leads of each stage of the buffer 50 are applied as input control signals to a translator decoder. Here, too, the translator decoder includes two cascaded stages. The first stage translator 54 includes three decoding matrices. The first of these matrices decodes the three least significant digits of the code transferred from the buffer 50. Structurally, the first decode matrix identified as decode LS in FIGURE 6 is identical to the matrix shown in FIGURE 2 of the drawing, the inputs to this matrix being the "trues" and the "primes" of the outputs of the translator input buffer stages TIE, TIF and TIG. The other two matrices are identical to each other but slightly different from the decode LS matrix. These two matrices identified as Decode MS–1 and Decode MS–2 may be of the form illustratively shown in FIGURE 7. It may be seen that the matrix of FIGURE 7 differs from that of FIGURE 2 by the condition of one more input line. This additional input line constitutes a disabling control for the matrices. One of the Decode MS matrices has this additional lead connected to the "true" outputs of the TID stage of the translator input buffer 50. The other Decode MS matrix has the additional line connected to the "prime" output lead of the TID stage of the translator input buffer 50. The "trues" and "primes" of the stages TIA, TIB and TIC of the translator input buffer 50 are connected identically to both of the Decode MS matrices, effectively in parallel with each other. With this arrangement, data signals in the TIA, TIB and TIC stages of the buffer 50 would tend to mark one line in each of the Decode MS matrices. However, at no time are both of the Decode MS matrices enabled; either a marked or an unmarked bit in the TID stage will disable one or the other of the Decode MS matrices. As before, each combination of marked and unmarked bits in the buffer stages TIA, TIB and TIC effect the selection of a unique one of the output columns as indicated. Thus, any character code, three digits of which are buffered in the TIA to TIC stages of the buffer 50 and a marked or unmarked bit buffered in the TID stage of the buffer 50, results in a signal appearing on only one of the sixteen output lines of the two matrices, Decoder MS–1 and Decoder MS–2.

As previously pointed out hereinbefore, the Decode LS matrix of the first stage translator 54 is identical with the Decode LS matrix of the first stage translator 14 of the system shown in FIGURE 1. Accordingly, the combination of marked or unmarked bits in the buffer stages TIE, TIF and TIG effect the selection of one of the gate output columns to carry an output signal from the matrix Decoder LS. Thus, the output of the Decoder LS matrix comprises a one-out-of-eight selection and the outputs of the Decoder MS matrices comprise a one-out-of-sixteen selection. As in the previous example, the output leads of the Decode LS matrix and the outputs of the Decode MS matrices are combined in a second stage translator 56. This second stage translator 56 is identical to the second stage translator 16 with the exception that it includes sixteen translator decoders TD1 through TD16, each of which includes eight AND gates.

Here, too, the output lead 58 from the Decode LS matrix is an eight-line multiple, all eight output leads of which are connected in parallel to all sixteen of the translator decoders TD1 through TD16. At each of the translator decoders TD1 through TD16, each of the output leads of the multiple 58 are connected, respectively, to one of the AND gates. The sixteen output leads from the two Decode MS matrices are separately applied to the translator decoders TD1 through TD16, one output lead to each of the translator decoders. Thus, each of the sixteen decoder MS output leads is separately "ANDed" with all eight of the output leads of the Decode LS matrix in the second stage of translator 56. Since, as before, the output of each of the sixteen translator decoders is in fact an eight-line multiple, there results an array of one hundred twenty-eight output leads from the second stage translator 56, only one of which is energized at any one time. Each of these one hundred twenty-eight leads is uniquely identified with an individual character or symbol represented by a particular permutational combination of the bits of the data code signals applied to the system from the memory means 42.

These one hundred twenty-eight individual character leads again represent an intermediate code for the characters represented by the input code. This intermediate code may be applied to any of a number of utilization devices including the character code generator such as the character generator matrix 20 shown in FIGURE 1. It may be seen that the system configuration represented in FIGURE 6 and augmented by the matrix format shown in FIGURE 7 employs the same inventive concepts as those set forth hereinbefore but is adapted to accommodate a seven-bit input code to produce a one hundred twenty-eight character output code.

Still within the framework of the present invention, the structure of the system may be further modified to accommodate an input signal having eight or more data bits per character.

Thus, there has been provided an improved code conversion means capable of functioning as means of generating display character signals from a multiple digit binary data processing code.

What is claimed is:

1. In a data processing apparatus including a source of data signals in a first code format having a predetermined bit count for each character represented and wherein different characters are represented by different permutational arrangements of the bits within said format, a code conversion means comprising register means for receiving said data signals and for doubling the bit count thereof;

decoding translator means connected to said register means output to receive said data signals in parallel order, said decoding translator means including a first stage translator and a second stage translator;

said first stage translator comprising at least two decoder matrices, means for connecting different selected combinations of the outputs from said register means to each of said matrices, each of said matrices having a plurality of output leads corresponding in number to the maximum number of distinct permutational arrangements of the bits applied thereto and comprising means for selecting and energizing a single one of said output leads for each permutational arrangement of the bits applied thereto; and said second stage translator comprising a plurality of gating means connected to said first stage translator for permutationally ANDing each of the output leads of at least one of said matrices with each output lead of the other of said matrices, said second stage translator having a plurality of translator output leads corresponding in number to the number of said characters to be represented, said plurality of gating means comprising means for selecting and energizing a separate one of said translator output leads for each permutational arrangement of the bits applied to said second stage translator.

2. The invention as set forth in claim 1 and characterized by the addition of encoding means connected to said individual translator output leads responsive to signals on said translator output leads for producing output data signals representing said characters in a second code format.

3. In a data processing apparatus including a source of data signals in a first code format having a predetermined bit count for each character represented and wherein different characters are represented by different permutational arrangement of the bits within said format, a code conversion means comprising first register means for receiving said data signals representing a character in serial order and for transferring said data signals in parallel order;

second register means connected to said first register for receiving said data signals in parallel order, said second register means including register output means for doubling the bit count of said data signals;

decoding translator means connected to said register output means to receive said data signals in parallel order, said decoding translator including a first stage translator and a second stage translator;

said first stage translator comprising a first and a second decoder matrix, said first decoder matrix being connected to a first half of said register output means and said second decoder matrix being connected to a second half of said register output means, said first decoder matrix having a plurality of output leads corresponding in number to the maximum number of distinct permutational arrangements of the bits in a first half of said data signals, said first decoder matrix comprising means for selecting and energizing a single one of said output leads for each permutational arrangement of said bits in said first half of said data signals, said second decoder matrix having a plurality of output leads corresponding in number to the maximum number of distinct permutational arrangements of the bits in at second half of said data signals, said second decoder matrix comprising means for selecting and energizing a single one of said output leads of said second matrix for each permutational arrangement of said bits in said second half of said data signals; and said second stage translator comprising a plurality of AND gates connected to said first stage translator for permutationally "ANDing" each of said output leads of said first decoder matrix with each of said output leads of said second decoder matrix, said second stage translator having a plurality of translator output leads corresponding in number to the product of the number of output leads of said first and second decoder matrices, said plurality of AND gates comprising means for selecting and energizing a separate one of said translator output leads for each said permutational arrangement of said bits, each translator output lead representing a distinct one of said characters.

4. The invention as set forth in claim 3 and characterized by the addition of encoder means connected to said translator output leads, said encoder means comprising an encoding matrix responsive to signals on selected ones of said translator output leads for producing output data signals corresponding to the characters represented by said signals on said selected ones of said translator output leads, said output data signals representing said characters in a second code format having a different predetermined bit count.

5. The invention as set forth in claim 4 wherein said output data signal bits are presented in parallel order, the addition of parallel to series conversion means comprising a plurality of gate means corresponding in number to the number of bits in said predetermined bit count of said output data signals, and means for sequentially actuating said gate means to pass said output data signals in serial order.

6. The invention as set forth in claim 4 wherein said first code format has a six-bit count serial signal, each decoder matrix has eight output leads, said second stage translator has sixty-four translator output leads, and wherein said second code format has a thirty-five bit count signal 7. In a data processing apparatus including a source of data signals in a first code format having a predetermined bit count for each character represented and wherein different characters are represented by different permutational arrangements of bits within said format, a code conversion means comprising first register means for receiving said data signals representing a character in serial order and for transferring said data signals in parallel order;

second register means connected to said first register means for receiving said data signals in parallel order, said second register means including register output means for doubling the bit count of said data signals;

decoding translator means connected to said register output means to receive said data signals in parallel order, said decoding translator including a first stage translator and a second stage translator;

said first stage translator comprising a first and a second decoder matrix means, said first decoder matrix means being connected to a first portion of said register output means and said second decoder matrix means being connected to the remainder of said register output means, said first decoder matrix means having a plurality of output leads corresponding in number to the maximum number of distinct permutational arrangements of the bits in a first portion of said data signals corresponding to said first portion of said register output means, said first decoder matrix means comprising means for selecting and energizing a single one of said output leads for each permutational arrangement of said bits in said first portion of said data signals, said second decoder matrix means having a plurality of output leads corresponding in number to the maximum number of distinct permutational arrangements of the bits in the remaining portion of said data signals, said second decoder matrix means comprising means for selecting and energizing a single one of said output leads for each permutational arrangement of said bits in said remaining portion of said data signals; and said second stage translator comprising a plurality of AND gates connected to said first stage translator for permutationally "ANDing" each of said output leads of said first decoder matrix means with each of said output leads of said second decoder matrix means, said second stage translator having a plurality of output leads corresponding in number to the product of the number of output leads of said first and second decoder matrix means, said plurality of AND gates comprising means for selecting and energizing a separate one of said second stage translator output leads for each said permutational arrangement of said bits, each second stage translator output lead representing a distinct one of said characters.

8. The invention as set forth in claim 7, wherein said second decoder matrix means includes a first and a second decoder matrix, said remainder of said register output means including a first group of output leads connected, respectively, in parallel to corresponding input lines of both of said first and second decode matrix, said remainder of said register output means also including a further pair of output leads which are oppositely and selectively energized by said second register means. one lead of said pair being connected to a control input on said first decoder matrix and the other lead of said pair being connected to a control input on said second decoder matrix whereby to selectively enable one or the other of said first and second matrix depending upon the relative energization of said pair of leads.

9. The invention as set forth in claim 8 wherein said first code format has a seven-bit count serial signal, said first decoder matrix means has eight output leads, each matrix of said second matrix means has eight output leads and said second stage translator has one hundred twenty-eight output leads.

References Cited

UNITED STATES PATENTS

| | | | |
|---|---|---|---|
| 2,862,660 | 12/1958 | Purcell | 340—347 X |
| 2,958,859 | 11/1960 | Lentz et al. | 340—347 |
| 3,076,956 | 2/1963 | Hagan et al. | 340—347 X |
| 3,079,597 | 2/1963 | Wild | 340—347 |
| 3,099,004 | 7/1963 | Hever | 340—347 |
| 3,197,760 | 7/1965 | Cohn et al. | 340—347 |
| 3,226,686 | 12/1965 | Adams et al. | 340—347 X |
| 3,258,584 | 6/1966 | Bucholz et al. | 340—347 X |
| 3,335,415 | 8/1967 | Conway et al. | 340—324.1 |

MAYNARD R. WILBUR, *Primary Examiner.*

GARY R. EDWARDS, *Assistant Examiner.*

U.S. Cl. X.R.

340—324.1